(12) United States Patent
Inai

(10) Patent No.: US 10,527,911 B2
(45) Date of Patent: Jan. 7, 2020

(54) ELECTRONIC APPARATUS CONFIGURED TO SELECT POSITIONS ON A DISPLAY UNIT BY TOUCH OPERATION AND CONTROL METHOD THEREOF

(71) Applicant: CANON KABUSHIKI KAISHA, Tokyo (JP)

(72) Inventor: Kento Inai, Zushi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 15/887,750

(22) Filed: Feb. 2, 2018

(65) Prior Publication Data

US 2018/0224723 A1 Aug. 9, 2018

(30) Foreign Application Priority Data

Feb. 6, 2017 (JP) .................. 2017-019783

(51) Int. Cl.
| | |
|---|---|
| H04N 5/222 | (2006.01) |
| G03B 17/20 | (2006.01) |
| G03B 13/06 | (2006.01) |
| G03B 17/02 | (2006.01) |
| H04N 5/235 | (2006.01) |
| G02B 7/28 | (2006.01) |
| H04N 5/232 | (2006.01) |
| G03B 13/36 | (2006.01) |

(52) U.S. Cl.
CPC ............. *G03B 17/20* (2013.01); *G02B 7/28* (2013.01); *G03B 13/06* (2013.01); *G03B 17/02* (2013.01); *H04N 5/232* (2013.01); *H04N 5/235* (2013.01); *G03B 13/36* (2013.01)

(58) Field of Classification Search
CPC .................................................. H04N 5/23216
See application file for complete search history.

(56) References Cited

U.S. PATENT DOCUMENTS

2013/0222301 A1* 8/2013 Lee .................. G06F 3/0485
345/173

FOREIGN PATENT DOCUMENTS

| JP | 2012-203143 A | 10/2012 |
| JP | 2013-92942 A | 5/2013 |

* cited by examiner

*Primary Examiner* — Gary C Vieaux
(74) *Attorney, Agent, or Firm* — Canon USA, Inc., IP Division

(57) ABSTRACT

An electronic apparatus includes a touch detection unit that detects a touch operation on a touch panel, a selection unit that selects positions on a display unit via a touch operation on the touch panel, and a control unit that controls the selection unit, wherein, in a case where a touch position movement is performed on the touch panel, the control unit controls the selection unit to select, from among positions of a plurality of selective candidates on the display unit existing in a direction of the touch position movement from a starting position of the touch position movement to a touch position at a first timing, positions based on a touch position movement up to a second timing after the first timing.

24 Claims, 9 Drawing Sheets

ELECTRONIC APPARATUS CONFIGURED TO SELECT POSITIONS ON A DISPLAY UNIT BY TOUCH OPERATION AND CONTROL METHOD THEREOF

BACKGROUND

Field

The present disclosure relates to a technique for selecting positions through a touch operation.

Description of the Related Art

There is a conventional method for selecting one of a plurality of items and specifying positions by moving a touch position. Japanese Patent Application Laid-Open No. 2012-203143 discusses a technique for setting an Auto Focus (AF) target position in an operation on a touch panel. Japanese Patent Application Laid-Open No. 2012-203143 discusses a technique for moving an AF target frame in the direction of a finger motion in a touch-move operation. Japanese Patent Application Laid-Open No. 2013-92942 discusses a technique for locking the scroll direction in one direction or performing scrolling in two different directions. More specifically, when either touch-move amounts in the X-axis or the Y-axis directions satisfies a threshold value, the technique locks the scroll direction in the direction satisfying the threshold value. When both touch-move amounts satisfy the threshold value, the technique performs scrolling in the X-axis and the Y-axis directions by the amount of a touch position movement.

If a touch-move is performed in an oblique direction on a touch panel, it is difficult to maintain the touch-move direction at the timing of starting the touch-move. If the determination method based on threshold values discussed in Japanese Patent Application Laid-Open No. 2013-92942 is performed when performing an operation for selecting positions through the touch operation discussed in Japanese Patent Application Laid-Open No. 2012-203143, the following phenomenon will result. More specifically, selective positions are limited to the X-axis or the Y-axis direction. Alternatively, if the movement direction curves toward the touch position, selective positions accordingly curve, and can possibly obliquely shift upward or downward from the direction initially intended by a user.

SUMMARY

The present disclosure is directed to making it easier for a user to select positions existing in a direction intended by the user when selecting positions through a touch operation.

According to an aspect of the present disclosure, an electronic apparatus includes a touch detection unit configured to detect a touch operation on a touch panel, a selection unit configured to select positions on a display unit via a touch operation on the touch panel, and a control unit configured to control the selection unit, wherein, in a case where a touch position movement is performed on the touch panel, the control unit controls the selection unit to select, from among positions of a plurality of selective candidates on the display unit existing in a direction of the touch position movement from a starting position of the touch position movement to a touch position at a first timing, positions based on a touch position movement up to a second timing after the first timing.

Further features will become apparent from the following description of exemplary embodiments with reference to the attached drawings.

DESCRIPTION OF THE EMBODIMENTS

An exemplary embodiment will be described below with reference to the accompanying drawings.

(Outer Appearance and Configuration of Digital Camera 100)

Figure 1A:
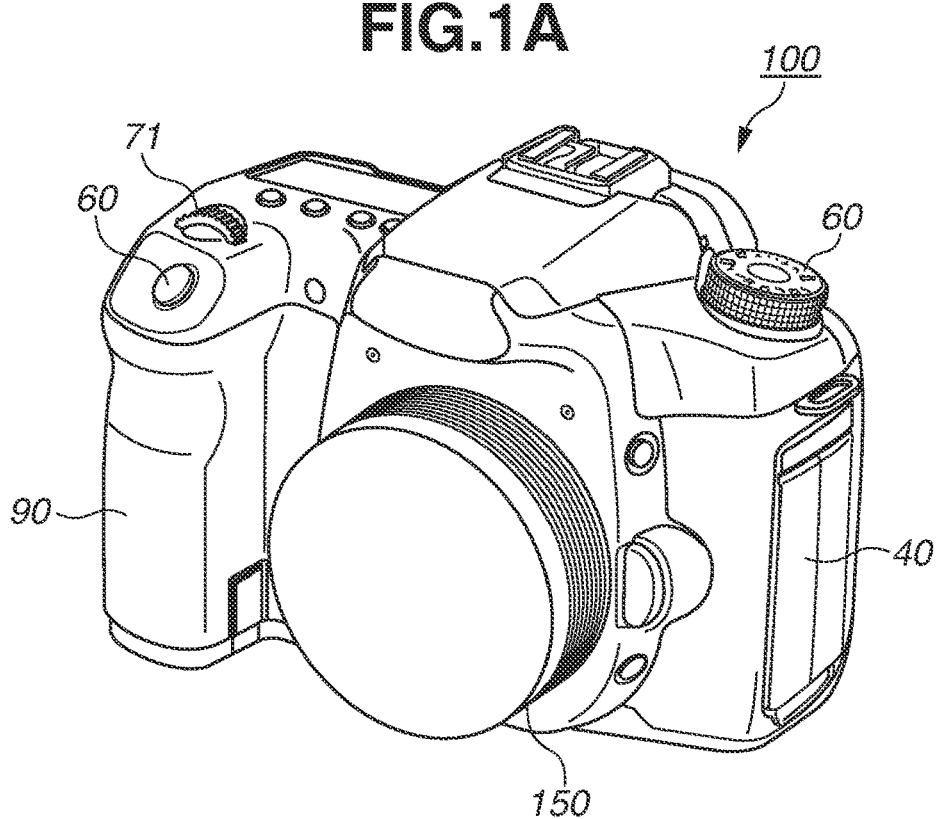
FIGS. 1A and 1B illustrate outer appearances of a digital camera as an example of an electronic apparatus according to an exemplary embodiment.
Figure 1B:
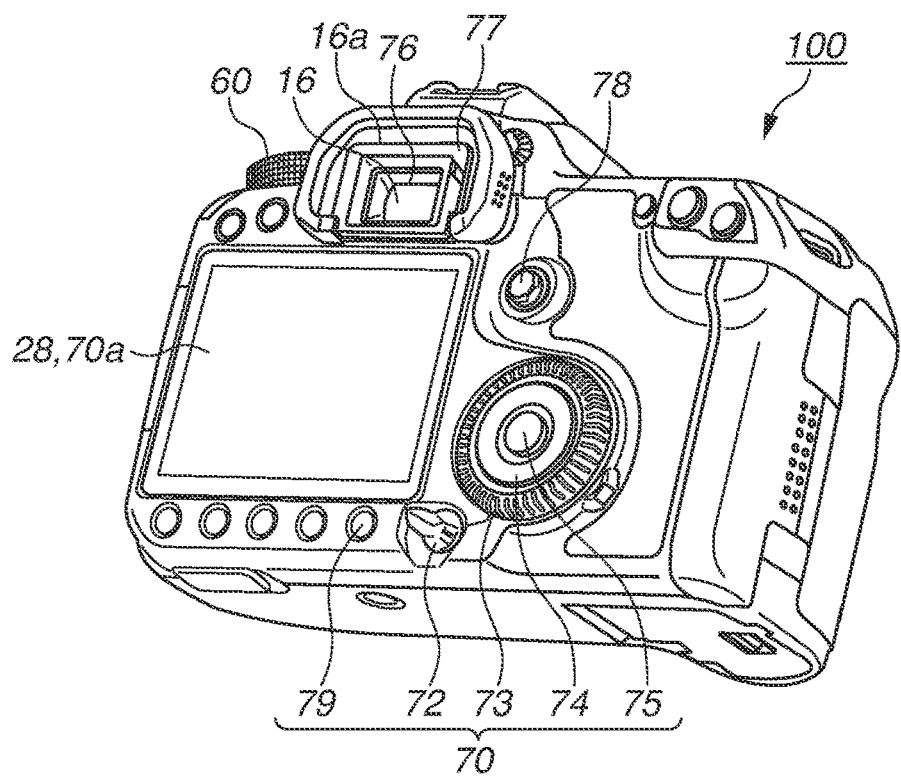

FIGS. 1A and 1B illustrate outer appearances of a digital camera as an example of an electronic apparatus according to the present exemplary embodiment. FIG. 1A is a perspective view illustrating the front face of a digital camera 100, and FIG. 1B is a perspective view illustrating the rear face of the digital camera 100.

Referring to FIG. 1A, a shutter button 61 is an operation member for issuing an imaging instruction. A mode selection switch 60 is a (switchable) operation member for selecting various modes. A terminal cover 40 protects connectors (not illustrated) such as a connection cable for connecting between an external apparatus and the digital camera 100. A main electronic dial 71 is a rotary operation member included in an operation panel 70. Turning the main electronic dial 71 enables changing setting values of the shutter speed and diaphragm. The shutter button 61 and the mode selection switch 60 are also included in the operation panel 70. A lens unit 150 is detachably attached to the digital camera 100. A grip portion 90 is a supporting portion (holding portion) for operating the digital camera 100 while supporting it. The operation panel 70 is provided on the side of the grip portion 90.

Referring to FIG. 1B, a power switch 72 included in the operation panel 70 is an operation member for turning power of the digital camera 100 ON and OFF. A sub electronic dial 73, a rotary operation member included in the operation panel 70, is used to move a selection frame and feed images. A cross key 74 included in the operation panel 70 is a four-way operation key of which the top, bottom, right, and left portions can be pressed. The cross key 74 enables performing operations based on a pressed portion. A SET button 75, a push button included in the operation panel 70, is mainly used to determine a selection item. A LV button (live view button) 78 included in the operation panel 70 turns live view (hereinafter referred to as LV) display on a display unit 28 ON and OFF in the still image capture mode. The LV button 78 is used to start and stop moving image capturing (recording) in the moving image capture mode. A playback button 79 included in the operation panel 70 is a manual operation button for switching between the capture mode and the playback mode. Pressing the playback button 79 in the capture mode shifts the digital camera 100 to the playback mode. In this mode, the last captured image of images recorded in a recording medium 200 (not illustrated in FIG. 1B) can be displayed on the display unit 28.

When a user looks into a finder 16, the user can view a subject through an optical viewfinder (OVF). An eyepiece sensor 77 is an object detection (eye contact detection) unit for detecting an object approaching at a distance closer than a predetermined distance such as 1 or 2 centimeters. For example, when the user brings an eye to the finder 16 (to look into an eyepiece portion 16a) to monitor an in-finder display unit 76 and the eyepiece sensor 77 detects the object (eye) approaching, the display of the in-finder display unit 76 is superimposed on the subject viewed through the OVF. When the eyepiece sensor 77 detects that the object (eye) has been separated from the finder 16 by a predetermined distance or farther, the in-finder display unit 76 hides display of items. Although, when the user looks into the finder 16, the display unit 28 becomes non-display, the digital camera 100 can accept touch operations on a touch panel 70a integrally formed with the display unit 28 for AF position setting. In this case, the user performs a touch operation on the touch panel 70a while holding the grip portion 90 and putting a finger on the shutter button 61. By operating the digital camera 100 in this way, the user can quickly perform an operation for moving positions of selection target AF frames and issuing an imaging instruction while monitoring the display (subject viewed through the OVF) on the in-finder display unit 76.

Figure 2:
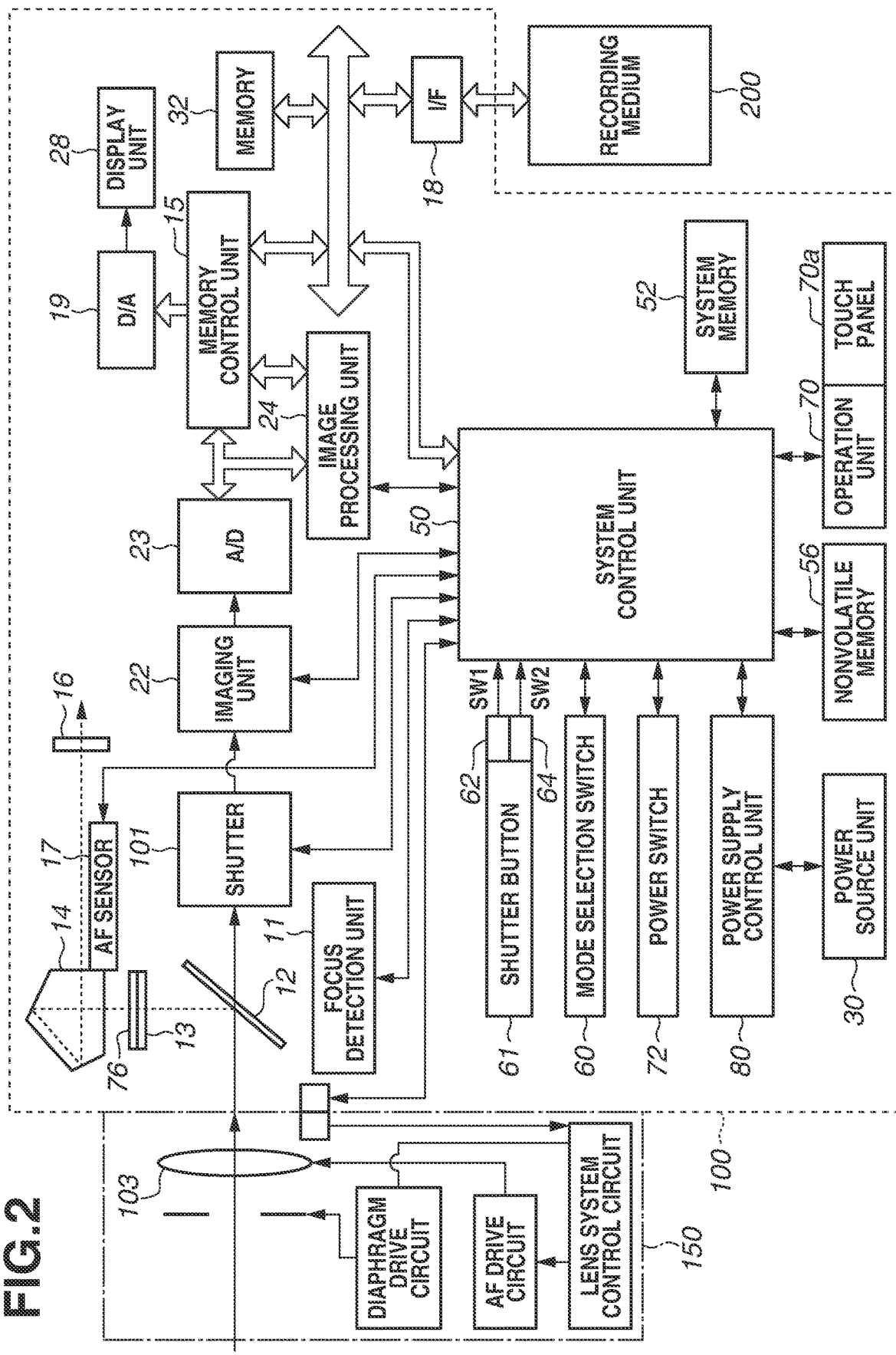
FIG. 2 is a block diagram illustrating an example of a function configuration of the digital camera according to the present exemplary embodiment.

An example of a function configuration of the digital camera 100 according to the present exemplary embodiment will be described below with reference to FIG. 2.

The lens unit 150 mounts an exchangeable image pickup lens (imaging optical system). Although a lens 103 normally includes a plurality of lenses, FIG. 2 illustrates only one lens for simplification.

An Auto Exposure (AE) sensor 17 measures the luminance of a subject image formed on a focusing screen 13 through the lens unit 150 and a quick return mirror 12. When performing exposure, live view imaging, and moving image capturing, the quick return mirror 12 (hereinafter referred to as a mirror 12) is moved up and down by an actuator (not illustrated) under the direction of the system control unit 50. The mirror 12 switches the destination of an incident light flux from the lens 103 between the finder 16 and the imaging unit 22. The mirror 12 is normally disposed to reflect the light flux to guide it to the finder 16. In the imaging and live view display states, the mirror 12 pops up to retreat from the light flux (mirror up) to guide the light flux to the imaging unit 22. The central part of the mirror 12 is configured as a half mirror to partially transmit light so that a part of the light flux is incident to the focus detection unit 11 for performing focus detection. The shutter 101 is used to control the exposure time of the imaging unit 22 under the control of the system control unit 50.

A photographer can confirm the focusing state and composition of an optical image of a subject obtained through the lens unit 150 by observing the image formed on the focusing screen 13 via a pentaprism 14 and the finder 16.

The in-finder display unit 76 is disposed on the optical path ranging from the lens 103 to the finder 16. The in-finder display unit 76 displays a frame (AF frame) indicating the current AF position and icons (items, marks, signs, etc.) indicating setting statuses of the digital camera 100 through the system control unit 50. The focusing screen 13 and the in-finder display unit 76 are disposed at adjacent positions in a superimposed way so that respective displays can be confirmed at one time.

The focus detection unit 11 (AF sensor) employs the phase difference detection method in which defocus amount information is output from the captured image to the system control unit 50. The system control unit 50 can adjust the degree of in-focus on the subject by using, for example, the defocus amount information corresponding to the AF frame position. For example, the system control unit 50 capable of controlling the lens unit 150 through a communication terminal displaces the position of the lens 103 via an AF drive circuit to perform the phase difference AF based on the defocus amount information. The AF method may be the contrast AF or imaging plane phase difference AF instead of the phase difference AF.

The imaging unit 22 is an image sensor composed of a Charge Coupled Device (CCD) or Complementary Metal-Oxide Semiconductor (CMOS) sensor for converting an optical image into an electrical signal. An analog-to-digital (A/D) converter 23 converts an analog signal output from the imaging unit 22 into a digital signal, and outputs the digital signal to a memory control unit 15 and an image processing unit 24.

An image processing unit 24 also performs predetermined pixel interpolation, resizing processing such as reduction, and color conversion processing on data from the A/D converter 23 or data from the memory control unit 15. The image processing unit 24 also performs predetermined calculation processing by using captured image data. The system control unit 50 performs exposure control and ranging control based on the obtained calculation result. This enables performing the AF processing, AE processing, and Electronic Flash Preliminary Emission (EF) processing based on the Through The Lens (TTL) method. The image processing unit 24 performs predetermined calculation processing by using captured image data, and performs TTL-based Automatic White Balance (AWB) processing based on the obtained calculation result.

The display unit 28 is a back monitor for displaying an image. The display unit 28 is not limited to a liquid crystal display, and can be other types of displays, such as an organic Electro Luminescence (EL) display.

The output data from the A/D converter 23 is written in the memory 32 via the image processing unit 24 and the memory control unit 15, or directly written therein via the memory control unit 15. The memory 32 stores image data obtained by the imaging unit 22 and converted into digital data by the A/D converter 23, and stores image data to be displayed on the display unit 28. The memory 32 has a sufficient storage capacity for storing a predetermined number of still images, and moving images and sound for a predetermined time period. The memory 32 also serves as an image display memory (video memory). A digital-to-analog (D/A) converter 19 converts image display data stored in the memory 32 into an analog signal and supplies the analog signal to the display unit 28 and the in-finder display unit 76. In this way, the image display data written in the memory 32 is displayed on the display unit 28 and the in-finder display unit 76 via the D/A converter 19. The display unit 28 and the in-finder display unit 76 display images corresponding to the analog signal from the D/A converter 19 on a display such as a liquid crystal display (LCD). The digital signal generated through the A/D conversion by the A/D converter 23 and stored in the memory 32 is converted into an analog signal by the D/A converter 19. If images are successively transmitted to the display unit 28 (an Eye View Finder (EVF) when the in-finder display unit 76 is an EVF) to be displayed thereon, the display unit 28 functions as an electronic view finder enabling live view display.

A nonvolatile memory 56 is an electrically erasable recordable memory such as an electrically erasable programmable read only memory (EEPROM). Constants and programs for operations of the system control unit 50 are stored in the nonvolatile memory 56. Programs stored in the nonvolatile memory 56 refer to programs for executing various flowcharts (described below) according to the present exemplary embodiment.

The system control unit 50 includes processors such as a central processing unit (CPU), micro processing unit (MPU), or graphics processing unit (GPU), and controls the entire digital camera 100. Each piece of processing according to the present exemplary embodiment (described below) is implemented when the system control unit 50 executes a program recorded in the above-described nonvolatile memory 56. Constants and variables for operations of the system control unit 50 and programs read from the nonvolatile memory 56 are loaded into a system memory 52 including a random access memory (RAM). The system control unit 50 also performs display control by controlling the memory 32, the D/A converter 19, the display unit 28, and the in-finder display unit 76.

The mode selection switch 60, the shutter button 61, and the operation panel 70 are operation units for inputting various operation instructions to the system control unit 50. The mode selection switch 60 switches the operation mode of the system control unit 50 between the image capture mode and the playback mode. The digital camera 100 has various scene modes as image capturing settings for image capturing scenes, the programmed AE mode, and the custom mode. The mode selection switch 60 enables the user to directly select one of these modes included in the menu screen. Alternatively, after once selecting the menu screen, the user can select either one of these modes included in the menu screen by using other operation members.

A first shutter switch 62 turns ON in the middle of an operation (half-depression) of the shutter button 61 provided on the digital camera 100 to generate a first shutter switch signal SW1 (half-depression means an image capturing preparation instruction). Upon receipt of the first shutter switch signal SW1, the system control unit 50 starts operations including the AF processing, AE processing, AWB processing, and EF processing. A second shutter switch 64 turns ON upon completion of an operation (full-depression) of the shutter button 61 to generate a second shutter switch signal SW2 (full-depression means an image capturing instruction). Upon receipt of the second shutter switch signal SW2, the system control unit 50 starts a series of image capturing operations ranging from signal reading from the imaging unit 22 to image data writing in the recording medium 200.

Each operation member of the operation panel 70 includes an operation member that is suitably assigned a function and serves as a function button for each scene when the user selects and operates various function icons displayed on the display unit 28. The operation panel 70 includes at least the shutter button 61, the main electronic dial 71, the power switch 72, the sub electronic dial 73, the cross key 74, the SET button 75, the LV button 78, and the playback button 79 described above with reference to FIG. 1B. The user can intuitively perform various settings by using the menu screen displayed on the display unit 28, the cross key 74 (four-way operation key), and the SET button.

A power supply control unit 80 includes a battery detection circuit, a direct current-to-direct current (DC-DC) converter, a switch circuit for selecting a block to be supplied with power, etc., to detect the presence or absence of a battery, the battery type, and the remaining battery capacity. The power supply control unit 80 controls the DC-DC converter based on the detection result and an instruction of the system control unit 50 to supply required voltages to the recording medium 200 and other components for required time periods. The power switch 72 receives a power ON/OFF operation.

A power source unit 30 includes a primary battery (such as an alkaline battery and a lithium battery), a secondary battery (such as a NiCd battery, a NiMH battery, and a Li battery), and an alternating current (AC) adaptor. A recording medium interface (I/F) 18 is an interface to the recording medium 200 such as a memory card and a hard disk. The recording medium 200, such a recording medium as a memory card for recording captured images, includes a semiconductor memory and a magnetic disk.

As one of the operation panel 70, the digital camera 100 is provided with the touch panel 70a that can detect contact on the display unit 28. The touch panel 70a and the display unit 28 can be integrally formed. For example, the touch panel 70a is configured so that the transmissivity of light does not disturb the display of the display unit 28, and is attached to the upper layer of the display surface of the display unit 28. Then, the input coordinates on the touch panel 70a are associated with the display coordinates on the display unit 28. This enables configuring such a graphical user interface (GUI) that enables the user to directly operate the screen displayed on the display unit 28. A setting in which a position where a touch operation is performed is associated with a position on the display unit 28 in a received instruction is referred to as an absolute coordinate setting.

Unlike the absolute coordinate setting, a setting in which, instead of touch coordinates, a move passage position from the current passage position or a predetermined position on the display unit 28 based on an amount of touch moving and a direction of touch moving is specified in a received instruction is referred to as a relative coordinate setting. In the relative coordinate setting, a passage position is moved corresponding to an amount of touch moving operation and a direction of touch moving operation.

When performing an operation while monitoring the in-finder display unit 76, if the user performs a touch operation with an absolute coordinate setting, the user will touch the touch panel 70a without monitoring the touch panel 70a (display unit 28), the user is highly likely to perform a touch operation at a position different from the desired position. When the user performs a touch operation with a relative coordinate setting, the user issues a moving instruction based not on the position but on the movement amount of the touch operation. Thus, when the user performs an operation for moving the operation target to a desired position while monitoring the position of the operation target displayed on the in-finder display unit 76, the user can issue an instruction for moving it to a desired position. An absolute coordinate setting and a relative coordinate setting can be set in a touch pad setting of a menu screen. When the user performs an operation while monitoring the display unit 28 with a relative coordinate setting, the touch position and the instruction position can become different possibly degrading operability. Accordingly, when the touch panel 70a receives a touch operation with a relative coordinate setting when the eyepiece sensor 77 detects an object approaching, favorable operability is provided both when the user is monitoring the display unit 28 and when the user is monitoring the in-finder display unit 76. A function that the touch panel 70a receives a touch operation while no image is displayed on the display unit 28 is referred to as a touch pad function.

The system control unit 50 can detect the following operations and states on the touch panel 70a (touch detection is possible):

An operation to start touching the touch panel 70a with a finger or pen (hereinafter referred to as a "touch-down")

A state where the finger or pen contacts the touch panel 70a (hereinafter referred to as a "touch-on")

An operation to move the finger or pen while in contact with the touch panel 70a (hereinafter referred to as a "touch-move")

An operation to remove the finger or pen from the touch panel 70a (hereinafter referred to as a "touch-up")

A state where the finger or pen is not in contact with the touch panel 70a (hereinafter referred to as a "touch-off")

When a touch-down is detected, a touch-on is detected at the same time. After a touch-down, a touch-on is normally kept being detected until a touch-up is detected. A touch-move is detected in a state where a touch-on is being detected. Even if a touch-on is detected, a touch-move is not detected if the touch position is not sliding (moving). After a touch-up is detected for all fingers or pen, a touch-off is detected.

These operations and states as well as position coordinates of the position where the finger or pen contacts the touch panel 70a are notified to the system control unit 50 via an internal bus. Based on the notified information, the system control unit 50 determines what kind of operation has been performed on the touch panel 70a. As for a touch-move, the movement direction of the finger or pen moving on the touch panel 70a can be determined for each of the vertical and horizontal components (longitudinal and lateral components, respectively) on the touch panel 70a based on changes of the position coordinates. An operation in which a touch-on is detected and, without a touch-move, a touch-up is quickly performed is referred to as a "tap". When a touch-down, a certain amount of a touch-move, and then a touch-up are performed on the touch panel 70a, a "stroke" is drawn. An operation to quickly draw a stroke is referred to as a "flick". A flick is an operation to quickly move the finger over a certain distance while in contact with the touch panel 70a and then release the finger therefrom. In other words, a flick is an operation to quickly flip the surface of the touch panel 70a with the finger or pen. When a touch-move at a predetermined speed or higher over a predetermined distance or longer is detected and then a touch-up is subsequently detected, it can be determined that a flick has been performed. When a touch-move at a speed lower than a predetermined speed over a predetermined distance or longer is detected, it can be determined that a drag has been performed. The touch panel 70a can be any one of various types including the resistance film type, capacitance type, surface elastic wave type, infrared type, electromagnetic induction type, image recognition type, and optical sensor type. Although a touch is detected when the finger or pen comes in contact with the touch panel 70a or when the finger or pen comes close to the touch panel 70a depending on the type, either type is applicable.

An example operation performed on AF frames via the touch panel 70a will be described below with reference to FIGS. 3A to 3E.

Figure 3A:
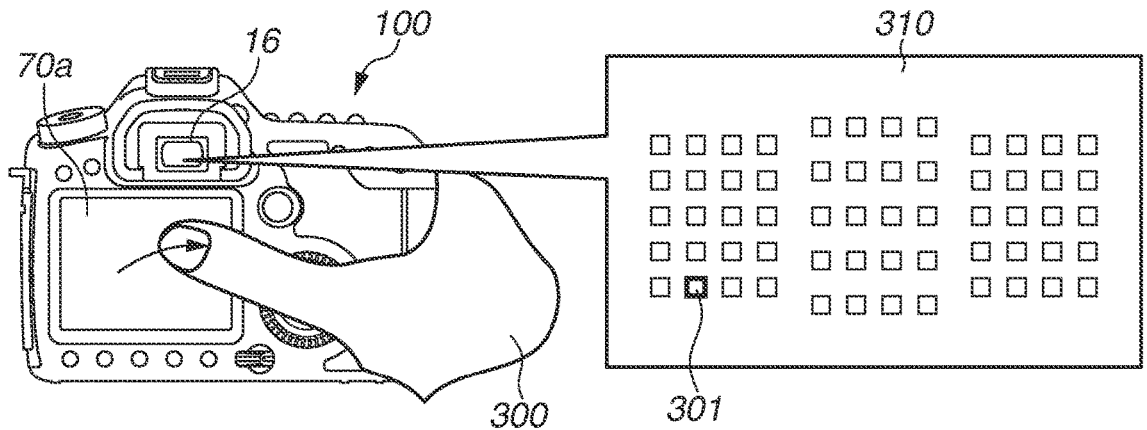
FIGS. 3A, 3B, 3C, 3D, and 3E illustrate selections of auto focus (AF) frames through touch-move operations according to the present exemplary embodiment.
Figure 3B:
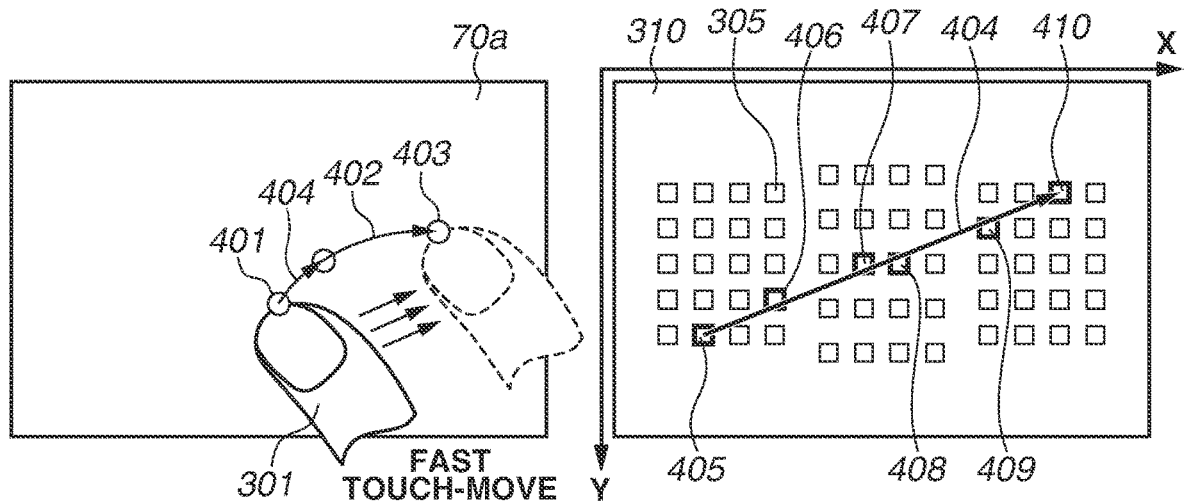

FIG. 3A illustrates a state where the user operates the touch panel 70a with a finger of the right hand 300 while gripping the digital camera 100 with the right hand 300. An example display (in-finder display 310) on the in-finder display unit 76 viewed when the user looks into the finder 16 is illustrated on the right-hand side in an enlarged way. The screen displays a plurality of selective AF frames 301 (selective AF frame candidates or candidate items) arranged in a grid pattern in the X-axis and the Y-axis directions. In the in-finder display 310 illustrated in FIG. 3A, the AF frames are arranged in three (right, center, and left) groups. In each of the right and left groups, four AF frames are arranged in the X-axis direction and five AF frames are arranged in the Y-axis direction. In the central group, four AF frames are arranged in the X-axis direction and five AF frame are arranged in the Y-axis direction. The right and left groups differ from the central group in intervals between AF frames arranged in the X-axis and Y-axis directions.

The AF frame movement is performed when the user performs a touch-move on the touch panel 70a. The AF frames indicate the position of a subject to be focused and are superimposed on a subject image formed on the in-finder display 310 which is superimposed on the focusing screen 13. The user can focus a desired subject by selecting the AF frame at the position of the subject to be focused out of the AF frames. The selected AF frame can be displayed with thick lines like the AF frame 301, flashed, or colored in red or yellow.

Processing for selective AF frame movement through a touch position movement will be described below with reference to FIG. 4 (4A and 4B). A series of operations illustrated in FIG. 4 (4A and 4B) is implemented by the system control unit 50 loading a program stored in the nonvolatile memory 56 into the system memory 52 and then executing the loaded program. This processing is started when power of the digital camera 100 is turned ON.

In step S401, the system control unit 50 determines whether an imaging instruction is received. For example, the system control unit 50 determines whether the second shutter switch 64 on the operation panel 70 is set to ON through what is called a full-depression (imaging instruction). When the second shutter switch 64 is set to ON (YES in step S401), the processing proceeds to step S402. On the other hand, when the second shutter switch 64 is not set to ON (NO in step S401), the processing proceeds to step S403.

In step S402, the system control unit 50 performs imaging processing. More specifically, the system control unit 50 controls each unit described above with reference to FIG. 2 to sequentially perform operations on an image signal output from the imaging unit 22 and then record the processed captured image in the recording medium 200.

In step S403, the system control unit 50 determines whether AF frame selection processing ends. The AF frame selection processing ends through an operation to turn power OFF, an operation to display a menu screen, or an operation to enter the playback mode. When an operation to end the AF frame selection processing is performed, the system control unit 50 ends the AF frame selection processing (YES in step S403). When an operation to end the AF frame selection processing is not performed (NO in step S403), the processing proceeds to step S404.

In step S404, the system control unit 50 determines whether the eyepiece sensor 77 is currently detecting the approach of an object (user face), i.e., in the eye contact state. More specifically, the system control unit 50 determines the presence or absence of the eye contact state based on information indicating the eye contact state output from the eyepiece sensor 77. When the system control unit 50 determines that the eye contact state is present (YES in step S404), the processing proceeds to step S405. When the system control unit 50 determines that the eye contact state is absent (NO in step S404), the processing proceeds to step S420. Although this processing has been described above centering on an example case where an object approaches the eyepiece sensor 77, the eye contact state can be detected by other methods. For example, the system control unit 50 can determine that the eye contact state is present if an optical image is displayed on the in-finder display unit 76 or that the eye contact state is absent if a live view image is displayed on the display unit 28. More specifically, the system control unit 50 can perform the determination in step S404 not by determining whether the approach to the finder 16 is detected, but by determining whether the subject image can be visually recognized through the finder 16.

In step S405, the system control unit 50 displays AF frames on the in-finder display unit 76. In step S406, the system control unit 50 determines whether a touch-down is detected. When the system control unit 50 determines that a touch-down is detected based on the signal output from the touch panel 70a (YES in step S406), the processing proceeds to step S407. When the system control unit 50 determines that a touch-down is not detected (NO in step S406), the processing returns to step S401.

In step S407, the system control unit 50 acquires information including position information of the currently selected AF frame. In step S408, the system control unit determines whether a touch-move is detected. For example, the system control unit 50 determines whether the touch position is moved based on the output from the touch panel 70a. When a touch-move is detected (YES in step S408), the processing proceeds to step S409. When a touch-move is not detected (NO in step S408), the processing proceeds to step S419.

In step S409, the system control unit 50 calculates a motion vector and movement distance (on the in-finder display unit 76) within a predetermined unit time by a touch-move. It is assumed that the coordinates of the in-finder display unit 76 corresponding to the current touch position are (Xn, Yn) and the coordinates corresponding to the last touch position before a predetermined time period are (X(n−1), Y(n−1)). The system control unit 50 calculates the motion vector within a predetermined unit time as (Xn−X(n−1), Yn−Y(n−1)). The system control unit 50 calculates the movement distance by calculating the length of the motion vector. The predetermined period is, for example, 0.2 or 0.5 seconds. The direction of the touch position movement within a predetermined time period since the touch-move was started (the direction of movement from the touch starting position to the current touch position) serves as the touch-move direction at the timing of starting the touch-move. Alternatively, a motion vector when the touch position has moved by a predetermined distance, for example, 0.5 or 1 cm, may be calculated.

In step S410, the system control unit 50 determines whether the speed of a touch-move is a predetermined value or higher, or lower than the predetermined value. For example, the system control unit 50 calculates the speed of a touch-move based on a motion vector for each predetermined unit time period calculated in step S409. When the calculated speed is the predetermined threshold value or higher, i.e., a fast touch-move (YES in step S410), the processing proceeds to step S411. When the calculated speed is lower than the predetermined threshold value, i.e., a slow touch-move (NO in step S410), the processing proceeds to step S412.

In step S412, since a slow touch-move was detected, the system control unit 50 determines AF frames existing in the direction of the detected motion vector as selection target AF frames. More specifically, in the example illustrated in FIG. 3C, AF frames (AF frames 505 to 514 in FIG. 3C) existing on (or closest to) a locus 504 on the in-finder display 310 corresponding to a locus 502 of the detected motion vector. When a slow touch-move is performed, for example, the user can perform an operation while monitoring the movement of the selective AF frame along with an AF frame 505 (selected at the timing of starting the touch-move) to AF frames 506, 507, and 508. Thus, the possibility that an unintended AF frame is selected is low. For example, if the AF frame 508 is currently selected although the user started a touch-move from the AF frame 505 intending to select an AF frame 515, the current touch-move direction is slightly low in order to select the position desired by the user. Accordingly, with a slow touch-move, the user can select the AF frame at the desired position by slightly upwardly shifting the locus 504 while monitoring the position of the AF frame currently being selected by the touch-move. Then, the processing proceeds to step S417.

In step S411, the system control unit 50 determines whether selective AF frame candidates have been determined. When selective AF frame candidates have been determined (YES in step S411), the processing proceeds to step S414. When selective AF frame candidates have not been determined (NO in step S411), the processing proceeds to step S413. More specifically, selective AF frame candidates are determined at the timing of starting the touch-move, and remain unchanged during the touch-move. More specifically, in a case where the user performs a touch-down in step S406 and then performs a touch-move for the first time, candidates are determined when the touch-move is determined to have been stopped (or the speed is determined to have been lowered) in step S417 (described below) and then a touch-move is performed. In other words, once a touch-move is started and then selective candidates are once determined, the position selection is performed only from selective candidates unless a predetermined condition is met, for example, a slow touch-move, stop, or touch-up.

In step S413, the system control unit 50 determines selective AF frame candidates. More specifically, the system control unit 50 obtains selective AF frame candidates based on the direction of the motion vector at the timing of starting the touch-move calculated in step S409 and the position of the current AF frame acquired in step S407. For example, AF frames 406 to 409, i.e., AF frames existing in the direction of a straight line 404 (the touch-move direction at the timing of starting the touch-move illustrated in FIG. 3B, viewed from the position of a currently selected AF frame 405) are determined as selective AF frame candidates. Even without determining selective AF frame candidates in step S413, the system control unit 50 can record the straight line 404 in the vector direction at the timing of starting the touch-move in the system memory 52, approximate the touch position onto the recorded straight line in processing (described below), and then select AF frames. To make it possible to identify AF frames selected as setting candidates (or selective position candidates), the system control unit 50 can change the color or line thickness of the AF frame candidates or flash the AF frame candidates.

In step S414, the system control unit 50 acquires the coordinates (Xn, Yn) on the in-finder display unit 76 corresponding to the touch position after the touch-move. More specifically, the system control unit 50 obtains the amount of the touch position movement and acquires the coordinates of the passage positions over the distance corresponding to the amount of the touch position movement (by the movement amount corresponding to the amount of the touch position movement) on the in-finder display unit 76.

In step S415, the system control unit 50 approximates the corresponding coordinates after the touch-move to the motion vector at the timing of starting the touch-move. More specifically, the system control unit 50 obtains the touch-move distance from the starting position to the current position of the touch-move, and approximates the corresponding coordinates onto the coordinates in a case of movement over the touch-move distance obtained from the vector at the timing of starting the touch-move. Alternatively, the system control unit 50 can approximate the touch-move distance to the coordinates on the vector closest to the current touch position. Alternatively, the system control unit 50 can obtain positions acquired by horizontally or vertically projecting the current touch position to the vector at the timing of starting the touch-move.

Thus, as a result of the touch-move, the touch position is approximated onto the vector at the timing of starting the touch-move. Accordingly, the user can select the desired position intended to be selected at the timing of starting the touch-move even if the locus of the touch-move has curved. More specifically, the system control unit 50 obtains the movement direction of the touch position movement since the timing of starting the touch-move till the first timing, and determines selective positions based on the touch position movement at the subsequent second timing and the movement direction obtained at the first timing.

In step S416, out of selective AF frame candidates obtained in step S413, the system control unit determines AF frames closest to the approximated positions as selection target AF frames. On the in-finder display unit 76, the system control unit 50 displays the determined selection target AF frames distinguishably from other AF frames to enable the user to visually recognize that these AF frames are determined as selection targets. However, if there is no AF frame close to the approximated positions, the system control unit 50 may not determine selection targets at the present time and then determine selection targets after another touch-move. When the user performs a fast touch-move, the following selective AF frame candidate is immediately selected, although the AF frame movement does not follow the touch-move operation as in a slow touch-move based on the touch-move distance. Thus, in a fast touch-move, user operability does not degrade either. While the user is performing a touch-move while grasping the grip portion 90, the hand which performs the touch-move is fixed to the grip portion 90. Accordingly, if the user quickly moves the finger, the touch position is not linearly moved but is likely to be arced around the root of the finger (in contact with the grip portion 90) as a rotation axis. Particularly while the user is looking into the finder 16, the user is intuitively performing operations without watching the finger performing the touch-move. In this state, thus, the touch position is highly likely to be unintentionally arced although the user believes that the user is linearly performing the touch-move. Consequently, even if the user intends to linearly perform a touch-move to a target position at the timing of starting the touch-move, the touch position can draw an unintended locus and thus unintended AF frames are highly likely to be selected. However, since approximation is performed based on the vector at the timing of starting the touch-move, as described above, the user can select AF frames reflecting the user's intention to a further extent.

In step S417, the system control unit 50 determines whether the touch-move at a predetermined speed or higher is in progress. When the system control unit 50 determines that the touch-move at the predetermined speed or higher is in progress (YES in step S417), the processing proceeds to step S418. When the speed of the touch-move becomes lower than the predetermined speed or when the touch-move stops (NO in step S417), the processing proceeds to step S419.

Figure 3C:
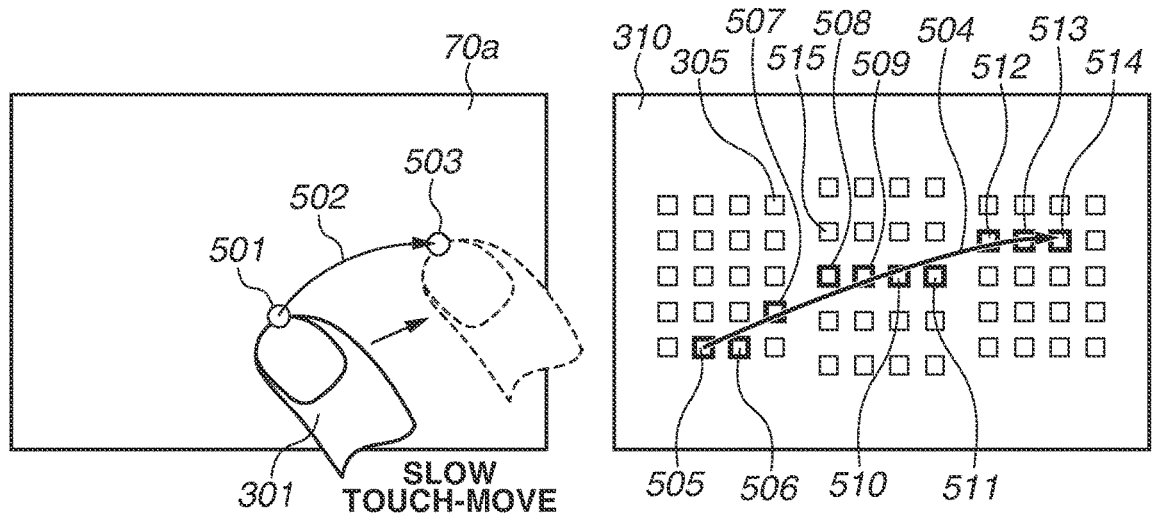
Figure 3D:
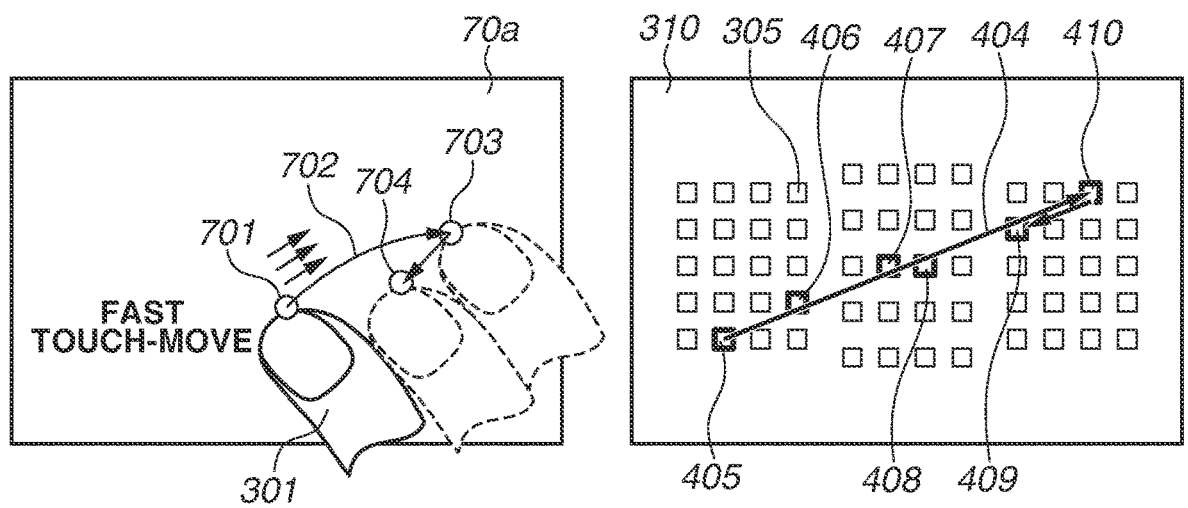

In step S418, the system control unit 50 updates the coordinates (Xn, Yn) as the last coordinates (X(n−1), Y(n−1)). The system control unit 50 also updates the current touch position as the coordinates (X(n), Y(n)). Then, the processing returns to step S409. In step S419, the system control unit 50 determines whether a touch-up has been performed. When the system control unit 50 determines that a touch-up has been performed (YES in step S419), the processing returns to step S401. When the system control unit 50 determines that a touch-up has not been performed (NO in step S419), the processing returns to step S408. Then, the system control unit 50 continues the processing for another touch-move. Even after a fast touch-move stops, if the fast touch-move resumes within a predetermined time period, the system control unit 50 can select AF frames at the positions corresponding to the current touch-move from the AF frame candidates determined at the timing of starting the touch-move, as illustrated in FIG. 3D. More specifically, at the timing of starting a fast touch-move, the AF frame 406 was selected and AF frames 406 to 408 were determined as selective AF frame candidates. Accordingly, the user is highly likely to be intending to select one of the AF frames 406 to 408. However, it is convenient that, if the user excessively performs the touch-move until an AF frame 410 is selected although the user intends to select the AF frame 409, the user can select the AF frame 409 simply by performing a touch-move in the opposite direction. More specifically, if the user performs a touch-move, for example, in the negative X-axis and the positive Y-axis directions opposite to the positive X-axis and the negative Y-axis directions, respectively, which are touch-move directions at the timing of starting the touch-move, AF frames may be selected from the last selective AF frame candidates. More specifically, the system control unit 50 can instruct a timer 131 to start counting (counting up) a predetermined time period, and the processing returns to step S408. If the touch-move is not restarted within the predetermined time period (for example, 2 or 1 second) before the timer 131 counts up, the processing may return to step S401. When the processing returns to step S408 while the timer 131 is operating, the system control unit 50 resets the timer 131 and restarts it. In step S408, the method for determining a touch-move is not limited to the method for determining the count-up of the timer 131. The system control unit 50 can be notified of the count-up through an interruption. In this case, when an interruption occurs, the processing can return to step S401.

When the system control unit 50 determines that the eye contact state is not present (NO in step S404), the processing proceeds to step S420. In step S420, the system control unit 50 displays a live view image on the display unit 28. Alternatively, the system control unit 50 can display an AF frame setting screen for displaying settable AF frame candidates in list form. In step S421, the system control unit 50 determines whether a touch-down is detected. When a touch-down is detected (YES in step S421), the processing proceeds to step S422. When a touch-down is not detected (NO in step S421), the processing returns to step S401.

Figure 3E:
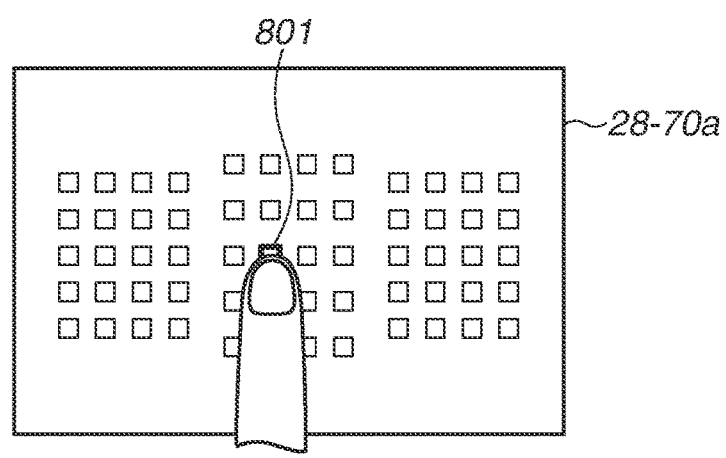

In step S422, the system control unit 50 determines as selection target AF frames the AF frames closest to the touch position where a touch-down was detected, and displays the determined AF frames. FIG. 3E illustrates an example of a case where a list of AF frame candidates is displayed on the display unit 28. As illustrated in FIG. 3E, the user selects an AF frame 801 at the position corresponding to the touched position on the touch panel 70a. More specifically, when a list of AF frame candidates or a live view image is displayed on the display unit 28, the touch position coincides with the position of the selective AF frame. When a live view image is displayed, AF frame candidates are not displayed and an AF position may be set (an AF frame may be displayed) at the touched position. Selecting the position corresponding to the touch starting position regardless of the positions of the last set AF frames is referred to as absolute coordinate input. As in the processing in steps S406 to S419, selecting the position corresponding to the amount of a touch-move from the positions of preselected AF frames (regardless of the touch starting position) is referred to as relative coordinate input.

In step S423, the system control unit 50 determines whether a touch-up is detected. When a touch-up is detected (YES in step S423), the processing returns to step S401. When a touch-up is not detected (NO in step S423), the processing returns to step S422.

The above-described processing enables implementing the operations illustrated in FIGS. 3B to 3E. More specifically, when a fast touch-move is performed, the AF frame is linearly moved on the vector at the timing of starting the touch-move, and, when a slow touch-move is performed, the AF frame is moved to the adjoining frame at passage positions corresponding to the touch-move.

Although, in the above-described exemplary embodiment, a linear approximation operation is performed in the case of a fast touch-move, AF frames can be selected by performing the approximation to a vector in the touch-move direction at the timing of starting the touch-move, regardless of a fast or a slow touch-move. More specifically, the system control unit 50 can perform the processing in steps S411 to S419 without performing the determination in step S410.

If the current touch-move direction has shifted from the touch-move direction at the timing of starting the touch-move by a predetermined amount or more, the system control unit 50 may not perform the approximation. The comparison with the touch-move direction at the timing of starting the touch-move can be performed if the vector direction of the current touch-move largely shifts from the vector direction at the timing of starting the touch-move, for example, in a case where the difference in the vector angle is 30 or 45 degrees or more. Alternatively, the comparison can be performed if the touch position is separated from the approximation straight line by a predetermined distance or more. Thus, when the user intentionally draws an arc, performing the approximation will select AF frames at positions separated from the position intended by the user. Accordingly, if the current touch-move direction shifts from the touch-move direction at the timing of starting the touch-move by the predetermined value or more, AF frames more suitable for the user intention can be selected by not performing the approximation (by selecting the processing in step S412).

A new starting position can be set at the timing when the touch-move direction shifts by the predetermined value, and the touch position can be approximated to a new straight line determined in the direction from the starting position.

While, in the above-described exemplary embodiment, AF frame selection is performed as an example of position selection through a touch-move, the processing is not limited thereto and is also applicable to AE (automatic exposure position) and cursor movement.

As described above, according to the present exemplary embodiment, it becomes easy to select positions more suitable for the user intention. AF frames at positions approximated in the touch-move direction at the timing of starting the touch-move are selected. Thus, it is possible to reduce the possibility that a position not intended by the user is selected if the user unintentionally draws an arc while the user believes that the user is linearly performing a touch-move.

Figure 4:
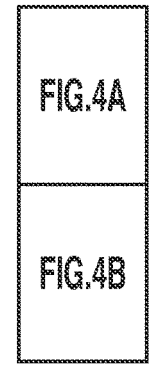
FIG. 4 (4A and 4B) is a flowchart illustrating a series of operations in AF frame selection processing according to the present exemplary embodiment.
Figure 4A:
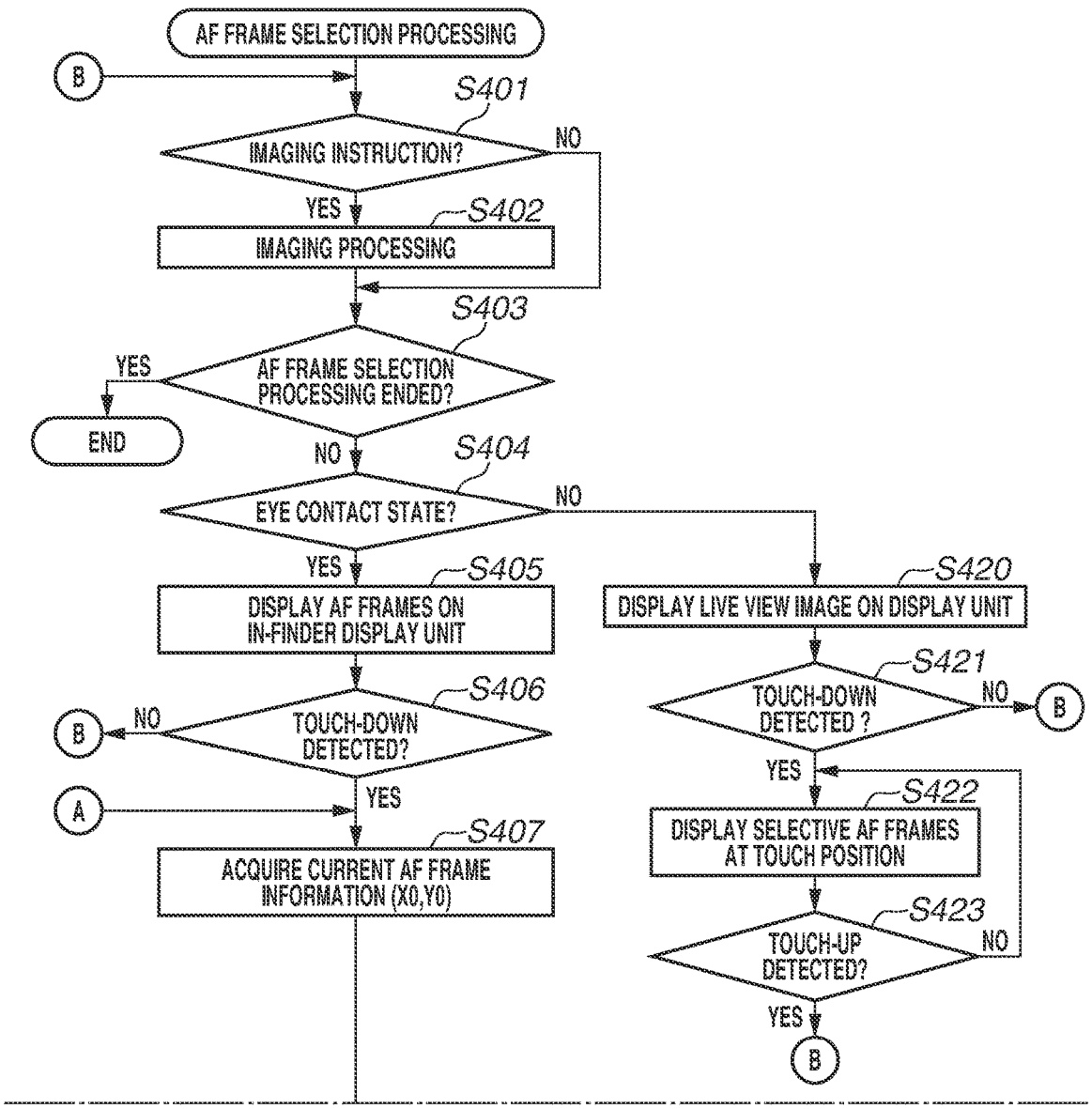
Figure 4B:
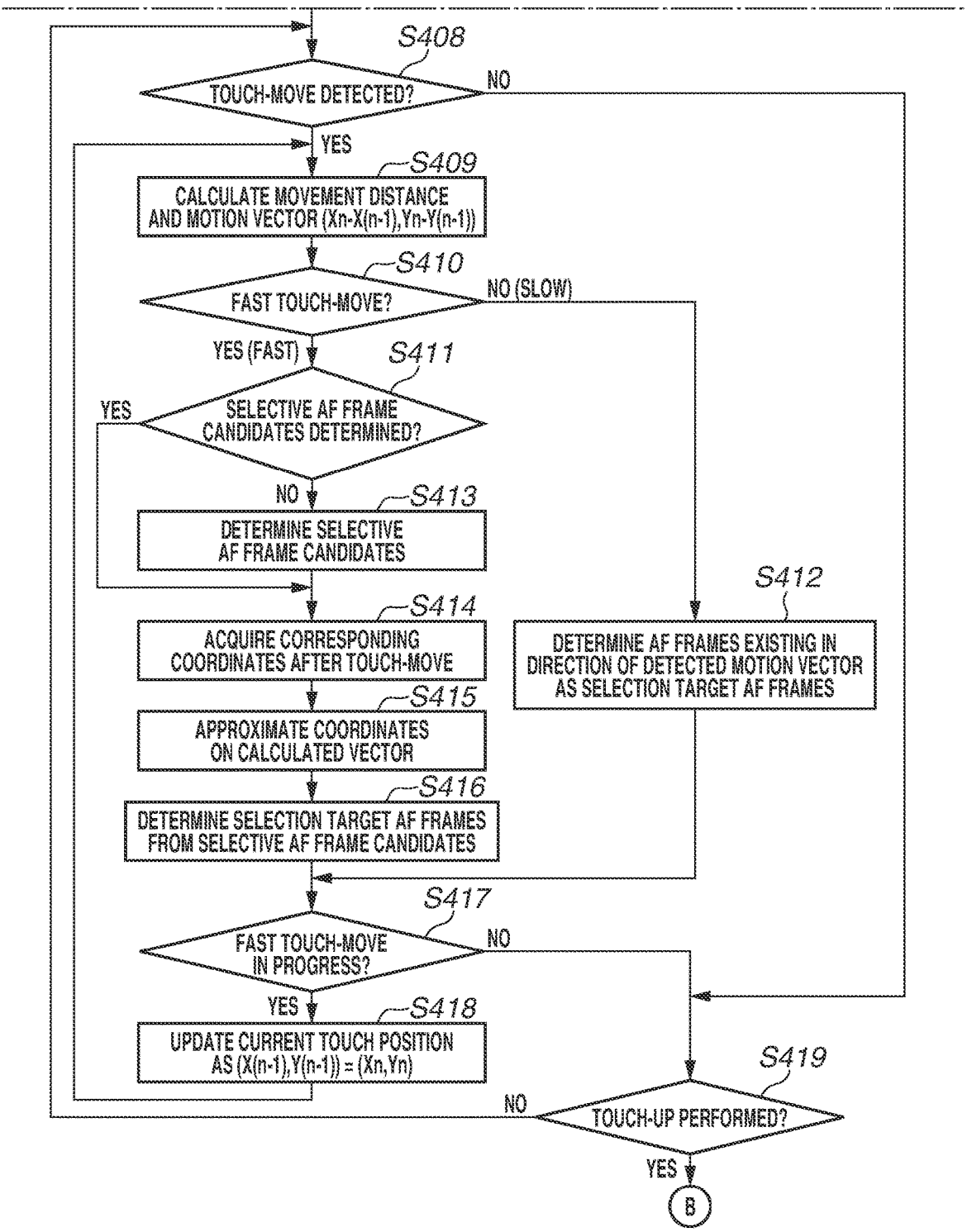

In the AF frame selection processing illustrated in FIG. 4 (4A and 4B), for example, when the user performs a fast touch-move in the positive X-axis and the negative Y-axis directions, once stops the touch-move without performing a touch-up, and then performs a slow touch-move in the positive X-axis and the positive Y-axis directions, the following AF frame movement results. More specifically, AF frames are selected from selective AF frame candidates corresponding to the touch-move direction at the timing of starting the first touch-move. Then, after the touch-move is once stopped and then a slow touch-move is started, AF frames are selected, as illustrated in FIG. 3C, without the approximation of the touch position in the touch-move direction at the timing of starting the touch-move after stopping.

In other words, when the user performs a fast touch-move, selective AF frames are determined by the positions of the AF frames selected before starting the touch-move, the touch-move direction at the timing of starting the touch-move, and the current touch position according to the above-described exemplary embodiment. When the user performs a slow touch-move, the following selective AF frame is determined not by the positions of the AF frames selected before starting the touch-move, but by the position of the currently selected AF frame and the movement amount from the coordinates touched at the timing of selecting the currently selected AF frame.

When an AF frame selection screen, a live view image and other operation targets are displayed on the touch panel 70a, if the selective positions are determined through the approximation based on the touch-move direction at the timing of starting the touch-move, the position touched by the finger shifts from the selective position. Thus, when operation candidates are displayed on the touch panel 70a, it is more preferable to select positions corresponding to the touch position without performing the approximation processing.

However, the processing is not limited thereto if selection targets (items) have been minutely set. More specifically, if the user unintentionally touches a plurality of selective candidates because a selection target is smaller than the finger, a different item can be selected because of a delicate inclination or shift of the finger. However, the use of the above-described exemplary embodiment enables the user to select an item more suitable for the user intention. More specifically, the system control unit 50 performs the processing in steps S405 to S419 regardless of the result of the determination in step S404 (without performing the determination in step S404). In other words, if the selection target is smaller than a predetermined value, the system control unit 50 can also perform the processing in steps S405 to S419 while the user is not looking into the finder 16. In this case, in step S405, the system control unit 50 displays items on the display unit 28.

While the movement of the selective AF frames has been described above, the above-described exemplary embodiment is also applicable to the movement of item display positions and the movement of selective positions.

Even if the user moves the touch position more than a desired selection target through a fast touch-move and then temporarily stops the touch-move, tracking the touch-move again enables moving the touched position in the approximation direction in the touch-move before stopping. This means that the user can select a desired AF frame in a more intuitive way. The system control unit 50 differentiates the determination whether to approximate the locus of the touch-move to a straight line between the eye contact state and the non-eye-contact state. In this way, the system control unit 50 does not perform approximation on positions along the touch-move direction at the timing of starting the touch-move more than necessary, and performs approximation when the user performs an operation without watching the finger. This processing enables the user to perform an intuitive operation.

Modifications of Above-Described Exemplary Embodiment

The above-described exemplary embodiment is also applicable to various modifications described below.

<<Example of Application to Case of Changeable Number of AF Frames>>

Selective AF frames can be set in a menu screen, or the presence or absence of linear approximation control and the mode of the linear approximation can be changed depending on the number of set AF frames.

Figure 5A:
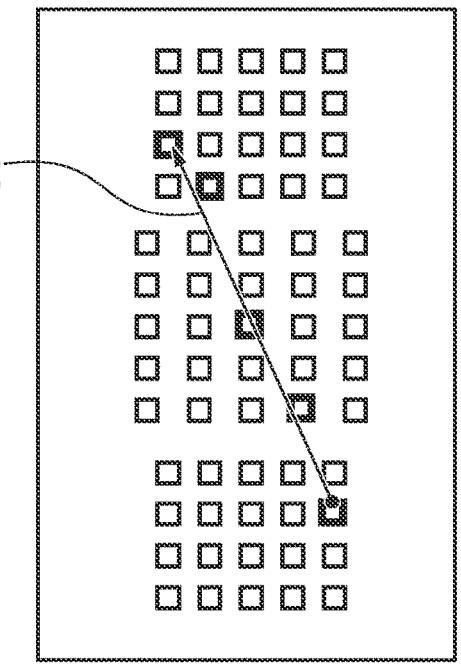
FIGS. 5A, 5B, 5C, and 5D illustrate examples of menu screen display and in-finder display according to the present exemplary embodiment.

For example, FIG. 5A illustrates an example of a menu screen 550 for setting the number of selective AF frames. The menu screen 550 illustrated in FIG. 5A is displayed on the display unit 28. As an example, FIG. 5A illustrates a state where the number of selective AF frames can be selected from 65, 21, and 9 points. A thick frame 551 indicates the currently selected setting. FIG. 5A illustrates a state where the number "65 points" is selected as the number of selective AF frames.

When the number "65 points" is selected as the number of selective AF frames illustrated in FIG. 5A, AF frames can be selected at all of 65 points. When the number "21 points" is selected in FIG. 5A, AF frames can be selected at 21 points drawn by thick lines illustrated in FIG. 5C. Similarly, when the number "9 points" is selected in FIG. 5A, AF frames can be selected at 9 points drawn by thick lines illustrated in FIG. 5D.

Figure 5B:
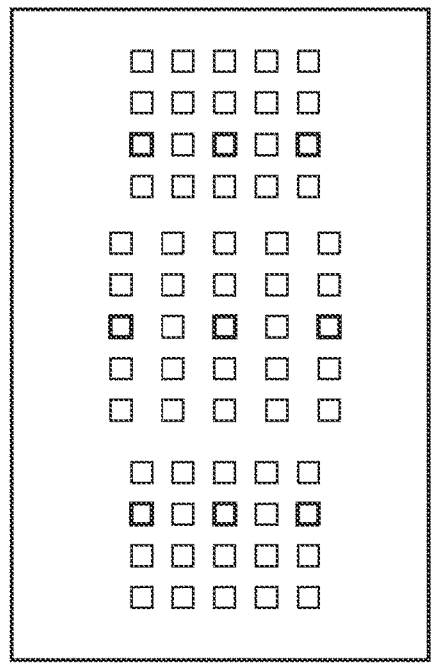
Figure 5C:
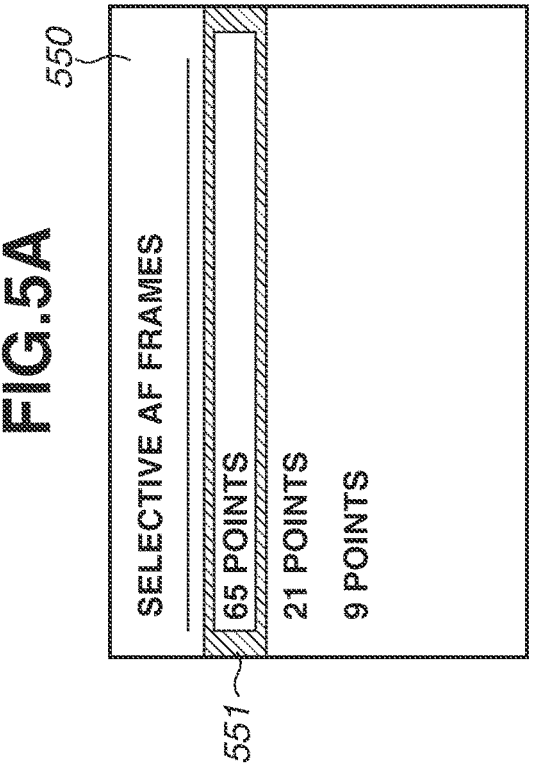

If there are a number of selective AF frames set in the menu screen 550, it is effective to perform processing for approximating the curve of a touch-move to a straight line, as described in the AF frame selection processing illustrated in FIG. 4 (4A and 4B). However, if there are a small number of selective AF frames as illustrated in FIGS. 5B and 5C, only three AF frames exist on a straight line (touch-move direction) 553. In this case, approximating the locus of a touch-move to a straight line can cause undesired AF frames to be selected.

Figure 5D:
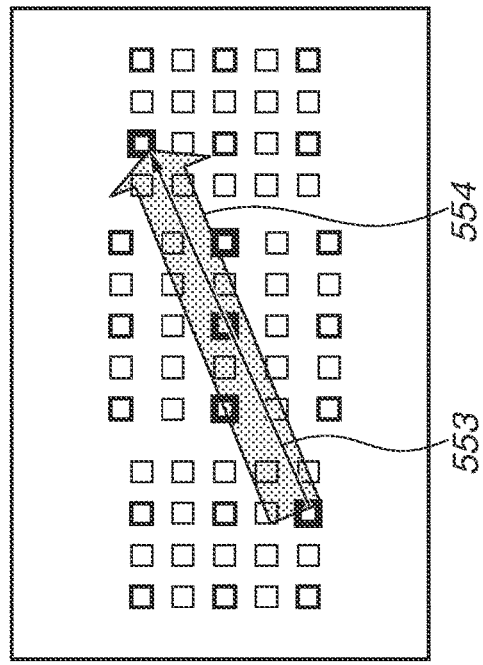

Accordingly, as illustrated in FIG. 5B, if the number of selective AF frames is greater than or equal to a predetermined number, the system control unit 50 considers as selective candidates the AF frames existing in the touch-move direction at the timing of starting the touch-move described in the AF frame selection processing illustrated in FIG. 4 (4A and 4B). More specifically, based on a touch-move, the system control unit 50 selects AF frames from among the six selective candidates existing in the touch-move direction 552 at the timing of starting the touch-move. If the number of AF frames is less than the predetermined number as illustrated in FIGS. 5C and 5D, there are a small number of selective candidates. For example, referring to FIG. 5C, there are three items existing in the touch-move direction 553 at the timing of starting the touch-move. If there are small number of selective candidates, selective AF frames move to a separate position each time the user performs a touch-move over a predetermined distance. Accordingly, the selective AF frame movement does not track the touch-move making the user feel low trackability. Thus, if the number of selective positions is less than a predetermined number, the system control unit 50 considers positions within a predetermined distance from the direction 553 as selective candidates. This enables the AF position movement to more minutely track the touch-move resulting in improved operability.

If the number of AF frames is less than the predetermined number, a straight line can have a fixed width to increase the number of selective AF frames, as indicated by an arrow 554 illustrated in FIG. 5C. Referring to FIGS. 5A to 5D, while the number of selective AF frames is 65, 21, and 9 points as an example, the number of selective AF frames is not limited thereto and can be an arbitrary number or an arbitrary combination. The predetermined number that indicates whether the linear approximation is to be performed can be set to an arbitrary number.

The number of selective AF frames can be determined by the types of lens to be connected to the digital camera 100 or the combination of the digital camera 100 and the lens unit 150. More specifically, all of 65 points can be made selectable for a predetermined lens unit as illustrated in FIG. 5B, and the number of AF frames illustrated in FIGS. 5C and 5D can be applied when other lens units are connected. More specifically, since the number of selective AF frames depends on the lens unit to be attached, the presence or absence of the linear approximation for a touch operation is controlled. This enables the AF frame movement toward a desired target without degrading operability even if the number of selective AF frames is arbitrarily set in the menu.

If it is possible to set whether an AF frame is to be selected for each point or a plurality of AF frames is to be collectively selected for each area (zone), the system control unit 50 can control the presence or absence of the linear approximation based on the setting. More specifically, when AF frames for each zone are set to be selected, the system control unit 50 may not apply the linear approximation even when the user performs a fast touch-move.

<<Example of Application to Case of Display on External Monitor>>

In a case where an external monitor is connected as a display unit through a High-Definition Multimedia Interface (HDMI®) cable enabling external output, by using a smart phone, a tablet PC, etc. as a remote control, the user can displays a menu screen, an image playback screen, a LV screen, etc., on the external monitor, and select positions and select items by moving a cursor.

In this case, the user operates the touch panel 70a while monitoring the external monitor. Thus, once the user starts a touch-move, the touch-move direction can downwardly curve in an unintentional way. In this case, the use of the above-described exemplary embodiment enables the user who once starts a touch-move to select a desired position even if the touch-move direction slightly shifts.

Accordingly, the system control unit 50 applies processing for approximating selective positions to the touch-mode depending on whether external display output is made, and does not perform the approximation if external display output is not made, thus improving operability. In this case, the system control unit 50 can periodically confirm external display output via HDMI® or detect connection and disconnection of HDMI® through interruption processing.

<<Example of Application to Case of EVF>>

The above-described exemplary embodiment can be applied to a case where an electronic view finder (EVF) is used as the finder 16. More specifically, suppose a case where the imaging unit 22 captures and image, and the system control unit 50 performs image processing on the image and outputs/displays a live view image on an EVF to use the EVF as the finder 16. In this case, when the user performs a touch-move operation to perform the AF frame movement, the system control unit 50 can select AF frames based on the touch-move direction at the timing of starting the touch-move. However, in the case of an electronic view finder, the system control unit 50 displays AF frames at selected positions rather than selecting one of the displayed AF frame candidates, and thus it is preferable to approximate the touch position. More specifically, the system control unit 50 does not perform the processing in step S413 illustrated in FIG. 4 (4A and 4B) but approximates selective positions to a vector in the touch-move direction at the timing of starting the touch-move.

In this case, the system control unit 50 approximates the touch position on the touch panel 70*a* to select the corresponding in-finder position. Alternatively, the system control unit 50 may not approximate the touch position on the touch panel 70*a*, but approximate in-finder passage positions corresponding to the touch-move to the motion vector of the selected position at the timing of starting the touch-move, and select positions.

The system control unit 50 can replace the above-described AF frame display with an enlarged area frame (described below), a WB correction point, a text input cursor, an International Organization for Standardization (ISO) sensitivity selection frame, and an image playback frame.

Figure 6A:
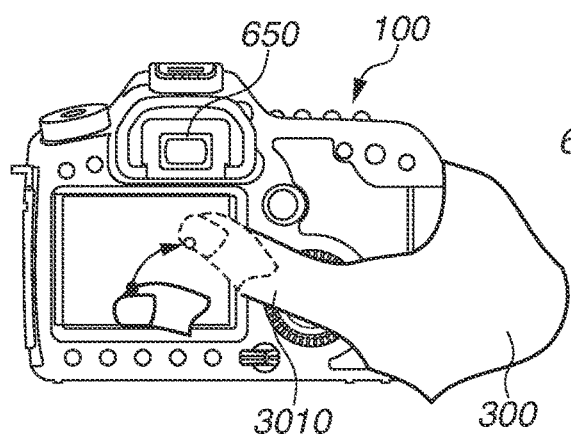
FIGS. 6A, 6B, 6C, 6D, 6E, 6F, 6G, and 6H illustrate modifications of the present exemplary embodiment.

FIGS. 6A to 6H illustrate examples in which an EVF 650 is applied to the above-described exemplary embodiment. FIG. 6A illustrates a state where the user is operating the touch-panel with a finger 3010 while looking into the EVF 650. Since the right hand grips the digital camera 100 as illustrated in FIGS. 3A to 3E, the locus of a touch-move can draw an arc during operation on the touch panel 70*a*.

Figure 6B:
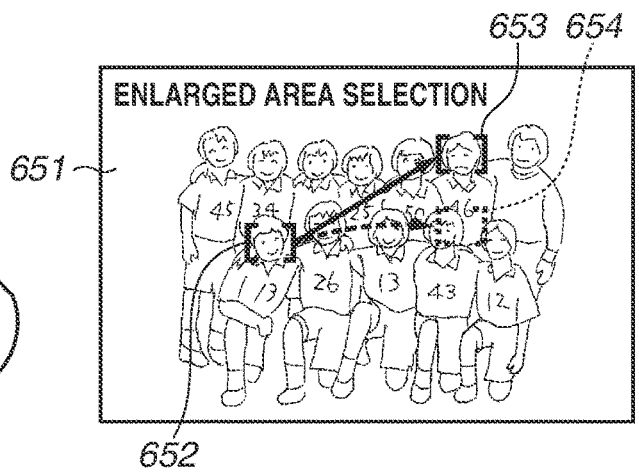

FIG. 6B illustrates an example display of the EVF 650, i.e., an example display of a screen for selecting an enlarged area (enlarged area selection screen 651) while displaying an LV image. The enlarged area selection screen 651 enables the user to check focus by enlarging a desired area. With the application of the above-described exemplary embodiment, for example, even if the locus of the touch-move draws an arc in a fast touch-move, performing control to move selection frames on an approximation straight line enables implementing a desired frame. More specifically, in the example illustrated in FIG. 6B, the user first performs a touch-move to move a selection frame from a position 652 of the selection frame. In this case of a fast touch-move, the system control unit 50 moves the selection frame to a position 653 on the approximation straight line. In a slow touch-move, the system control unit 50 moves the selection frame to a position 654 on the locus of the actual touch-move without performing the linear approximation.

Figure 6C:
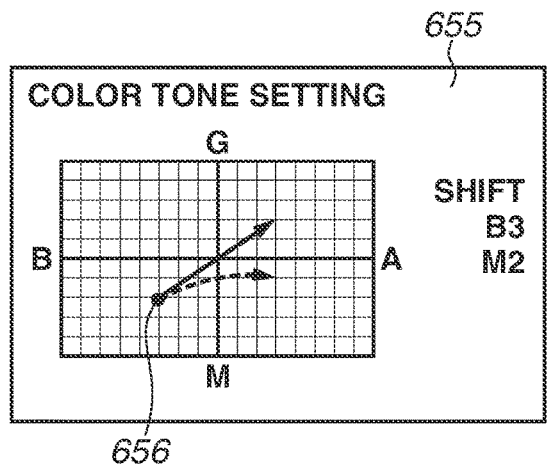

FIG. 6C illustrates an example display of the EVF 650, i.e., a color tone setting screen 655 in the menu screen 550. A position that indicates the current color tone setting is assumed to exist at a position 656. In a fast touch-move, the system control unit 50 moves a point for identifying the WB correction value on the approximation straight line (solid line). In a slow touch-move, the system control unit 50 moves the point identifying the WB correction value just along the line (dotted line) of the touch operation.

Figure 6D:
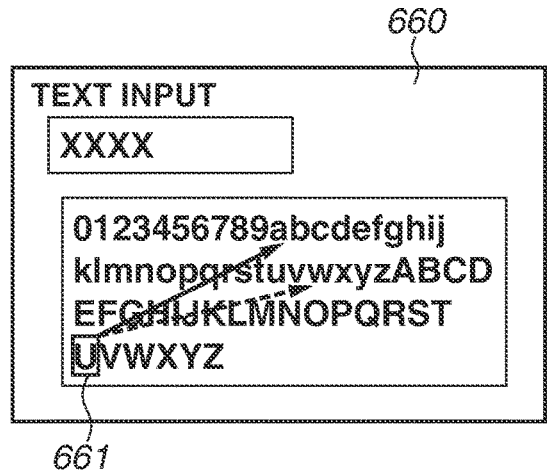

FIG. 6D illustrates an example display of the EVF 650, i.e., an example of a text input screen 660 for inputting characters in the menu screen 550. A cursor indicating the position of the currently selected character exists at a position 661. In a fast touch-move, the system control unit 50 moves the cursor indicating the currently selected character on the approximation straight line (solid line). In a slow touch-move, the system control unit 50 moves the cursor indicating the currently selected character just along the line (dotted line) of the touch operation.

Figure 6E:
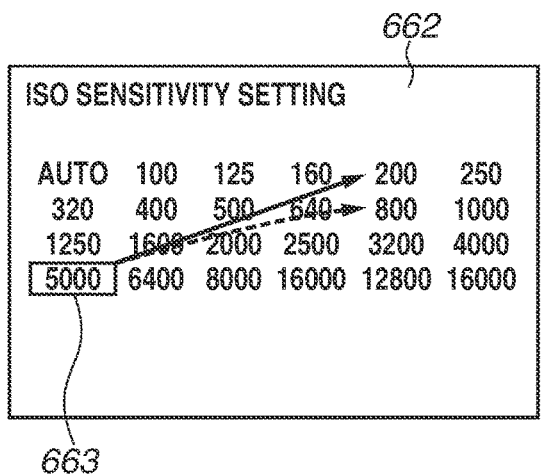

FIG. 6E illustrates an example display of the EVF 650, i.e., an example of an ISO sensitivity setting screen 662 for setting the ISO sensitivity in the menu screen 550. A cursor indicating a position 663 of the currently selected ISO sensitivity setting exists at the position 663. In a fast touch-move, the system control unit 50 moves the cursor indicating the ISO sensitivity on the approximation straight line (solid line). In a slow touch-move, the system control unit 50 moves the cursor indicating the ISO sensitivity just along the line (dotted line) of the touch operation.

Figure 6F:
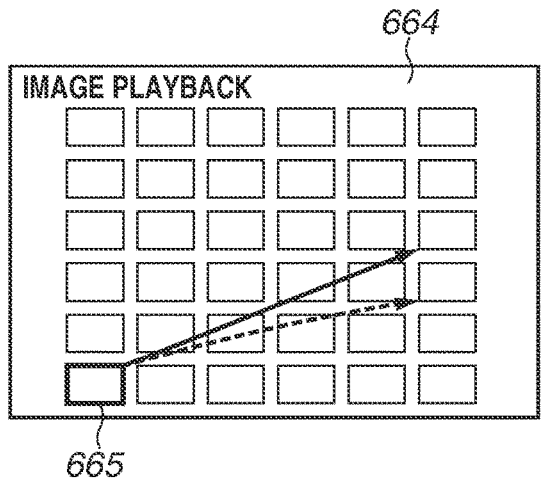

FIG. 6F illustrates an example display of the EVF 650, i.e., an example of an image playback screen 664 for performing index display to enable image selection. A cursor indicating the currently selected image exists at a position 665. In a fast touch-move, the system control unit 50 moves the cursor indicating the currently selected image on the approximation straight line (solid line). In a slow touch-move, the system control unit 50 moves the cursor indicating the currently selected image just along the line (dotted line) of the touch operation.

In an apparatus having an EVF, performing processing in this way enables easily moving the position of a selective candidate to a desired selection target in the above-described UIs, such as the enlarged area selection screen 651 and a WB correction setting screen.

Figure 6G:
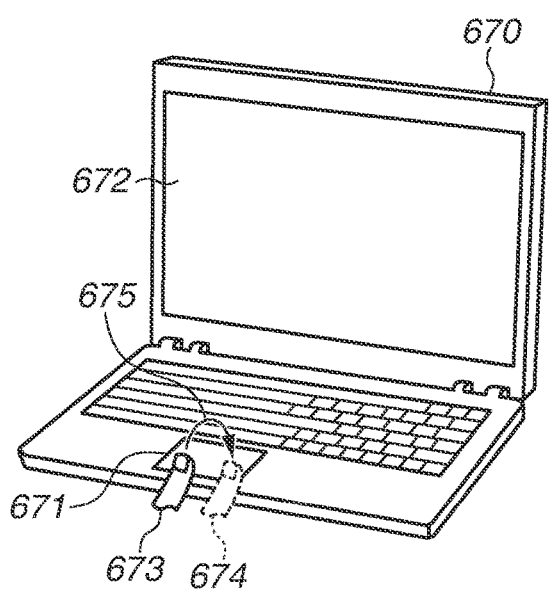
Figure 6H:
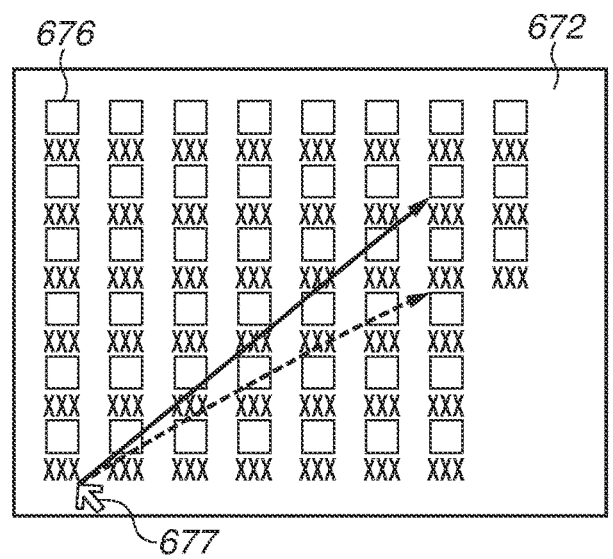

The above-described exemplary embodiment can be applied to a personal computer (PC) 670 including a touch pad as illustrated in FIG. 6G. A touch pad 671, an operation unit for receiving touch operations from a user, is disposed as a unit different from a display unit of the PC 670. Similar to the touch panel 70*a*, the touch pad 671 can be of any one of various types including the resistance film type, capacitance type, surface elastic wave type, infrared type, electromagnetic induction type, image recognition type, and optical sensor type. While a touch is detected when a finger or pen comes in contact with the touch panel 70*a* or when a finger or pen comes close to the touch panel 70*a*, depending on the type, either type is applicable. Similar to a case where the digital camera 100 is operated, the locus of the finger operating the touch pad 671 can draw an arc, as indicated by touch points 673 and 674 and a locus 675 illustrated in FIG. 6G. More specifically, when the user operates the touch pad 671 with a finger, the locus 675 of a touch-move from the touch starting point 673 to the touch ending point 674 can draw an arc. FIG. 6H illustrates an example display of a display unit 672 of the PC 670. For example, in a state where a plurality of icons 676 is arranged on the desktop, the user moves a cursor 677 by performing a touch operation on the touch pad 671. In this case, even if the touch-move direction unintentionally shifts, performing control to move the cursor 677 on an approximation straight line enables moving the cursor 677 to the position of a desired selection target. In this way, even if the locus of a touch-move is not linear in a touch pad operation, performing the linear approximation enables moving the cursor 677 to the position of a desired selection target.

While, in the above-described exemplary embodiment, the touch-move direction at the timing of starting a touch-move is an oblique direction, the present exemplary embodiment is also applicable to a case where the touch-move direction is either the X-axis or the Y-axis direction. More specifically, even if the user starts a touch-move intending to perform a touch-move in the X-axis direction and the touch-move direction slightly shifts in the Y-axis direction during the operation, the use of the above-described exemplary embodiment enables moving the touch position along the X-axis direction. However, in this case, the touch-move direction at the timing of starting the touch-move is the X-axis direction, and the movement direction is not determined based on a predetermined X- or Y-axis direction.

While the present exemplary embodiments have specifically been described above, it is not seen to be limiting and can be modified in diverse ways within the scope of the appended claims.

The above-described various control processing to be performed by the system control unit 50 can be performed by a single hardware component, and the entire electronic apparatus can be controlled by a plurality of hardware components that share processing.

While the present disclosure has specifically been described above based on exemplary embodiments, the present disclosure is not limited thereto and can be modified in diverse ways without departing from the spirit and scope thereof. The above-described exemplary embodiments are considered as illustrative and not restrictive of the scope of the present disclosure. These exemplary embodiments can be suitably combined.

While the above-described exemplary embodiments describe a digital camera 100, this is not seen to be limiting. More specifically, the present disclosure is applicable to a personal computer and a personal digital assistant (PDA) enabling position selection through a touch operation, and a mobile phone terminal, a portable image viewer, a printer apparatus, a digital photo frame, a music player, a game machine, an electronic book reader, a projection apparatus, etc. with a touch panel. The present disclosure is also applicable to a tablet terminal, a smart phone, and a household appliance, an onboard apparatus, a medical apparatus, etc. with a touch panel. In a medical apparatus, the present disclosure is useful in cases of performing a touch pad operation while monitoring a subject and an operation target portion.

At least one of the functions of the above-described exemplary embodiments can also be achieved by supplying a program to a system or apparatus via a network or storage medium, and at least one processor in a computer of the system or apparatus reads and executes the program. The at least one function can also be achieved by a circuit (for example, an application specific integrated circuit (ASIC)).

The present disclosure makes it easier for a user to select positions existing in a direction intended by the user when selecting positions through a touch operation.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-019783, filed Feb. 6, 2017, which is hereby incorporated by reference herein in its entirety.

What is claimed is:

1. An electronic apparatus comprising:
   at least one memory and at least one processor which function as:
   a touch detection unit configured to detect a touch operation on a touch panel;
   a selection unit configured to select positions on a display unit via a touch operation on the touch panel; and
   a control unit configured to control the selection unit,
   wherein, in a case where a touch position movement is performed on the touch panel, the control unit controls the selection unit to select, from among positions of a plurality of selective candidates on the display unit existing in a direction of the touch position movement from a starting position of the touch position movement to a touch position at a first timing, positions based on a touch position movement up to a second timing after the first timing.

2. The electronic apparatus according to claim 1, where the at least one memory and the at least one processor further function as a determination unit configured to determine some of all of positions on the display unit as selective candidates based on the direction of the touch position movement from the starting position of the touch position movement to the touch position at the first timing.

3. The electronic apparatus according to claim 2, wherein, from all of the positions on the display unit, the determination unit does not consider positions not existing in the movement direction as selective candidates.

4. The electronic apparatus according to claim 1, wherein the control unit controls the selection unit to select, from the plurality of selective candidates, positions of selective candidates closest to passage positions corresponding to movement from a position selected at a timing of starting the touch position movement to the touch position up to the second timing.

5. The electronic apparatus according to claim 1, wherein the control unit controls the selection unit to select positions of selective candidates at positions away from a position selected at a timing of starting the touch position movement based on an amount of movement from the touch position at the timing of starting the touch position movement to the touch position up to the second timing.

6. The electronic apparatus according to claim 1, wherein, in a case where the touch position is moving faster than a predetermined speed, the control unit controls the selection unit to select positions based on the touch position movement up to the second timing from the positions of the plurality of selective candidates.

7. The electronic apparatus according to claim 1, wherein, in a case where the touch position is moving slower than a predetermined speed and the touch position movement is performed on the touch panel, the control unit controls the selection unit to select positions based on the touch position movement up to the second timing.

8. The electronic apparatus according to claim 1, where the at least one memory and the at least one processor further function as a setting unit configured to enable setting either an absolute coordinate setting for selecting a position on the display unit corresponding to the touch starting position on the touch panel or a relative coordinate setting for selecting passage positions corresponding to an amount of the touch position movement on the touch panel from a position selected at a timing of starting a touch without selecting a position corresponding to the touch starting position,
wherein, in a case of the relative coordinate setting, the control unit controls the selection unit to select the position based on the touch position movement up to the second timing out of the positions of the plurality of selective candidates, and
wherein, in a case of the absolute coordinate setting, the control unit controls the selection unit to select positions based on the touch position movement up to the second timing.

9. The electronic apparatus according to claim 8, wherein the control unit controls the display unit to display an item indicating the position selected on the display unit.

10. The electronic apparatus according to claim 9, wherein, in a case where a touch position movement is performed on the touch panel when the item is not superimposed on the touch panel, the control unit controls the selection unit to select positions based on the touch position movement up to the second timing from the positions of the plurality of selective candidates.

11. The electronic apparatus according to claim 9,
wherein the electronic apparatus is connectable to an external display apparatus of the electronic apparatus, and
wherein, in a case where a touch position movement is performed on the touch panel when the item is displayed on the external display apparatus, the control unit controls the selection unit to select positions based on the touch position movement up to the second timing from the positions of the plurality of selective candidates.

12. The electronic apparatus according to claim 1, wherein, in a case where the display unit and the touch panel are provided as separate units, the control unit controls the selection unit to select positions based on the touch position movement up to the second timing from the positions of the plurality of selective candidates when a touch position movement is performed on the touch panel, and
wherein, in a case where the display unit and the touch panel are provided as one unit, the control unit controls the selection unit to select positions based on the touch position movement up to the second timing when a touch position movement is performed on the touch panel.

13. The electronic apparatus according to claim 1, where the at least one memory and the at least one processor further function as an approach detection unit configured to detect an approach of an object to a finder that enables visually recognizing the display unit,
wherein, in a case where a touch position movement is performed on the touch panel when the approach detection unit is detecting the approach, the control unit controls the selection unit to select positions based on the touch position movement up to the second timing from the positions of the plurality of selective candidates.

14. The electronic apparatus according to claim 1, wherein, after positions of the plurality of selective candidates are determined, selective positions derived via the touch position movement are some of the plurality of selective candidates until a touch operation satisfies a predetermined condition.

15. The electronic apparatus according to claim 14, wherein the predetermined condition is that a speed of the touch position movement becomes lower than a predetermined speed.

16. The electronic apparatus according to claim 1, wherein the direction of the touch position movement from the starting position of the touch position movement to the touch position at the first timing is determined based on a horizontal and a vertical component of a movement amount of a movement within a predetermined time period since a start of the touch position movement.

17. The electronic apparatus according to claim 1, wherein the plurality of selective candidates are determined at the first timing.

18. The electronic apparatus according to claim 1, wherein candidate items indicating selective positions derived via the touch position movement are displayed on the display unit, and the candidate items are displayed in a grid pattern along a horizontal and a vertical direction.

19. The electronic apparatus according to claim 18, wherein, from among the candidate items, candidate items existing on a straight line based on a direction of the movement from the starting position of the touch position movement to the touch position at the first timing are determined as selective candidates.

20. The electronic apparatus according to claim 19, wherein, in a case where a number of selective positions derived via the touch position movement on the display unit is less than a predetermined number, candidate items within a predetermined distance from the straight line, including candidate items not existing on the straight line, are selected as the selective candidates.

21. The electronic apparatus according to claim 18, wherein the candidate items are AF frames.

22. The electronic apparatus according to claim 1, wherein a direction of movement from the starting position of the touch position movement to the touch position at the first timing is any one direction including directions different from the horizontal and the vertical directions on the touch panel.

23. A method for controlling an electronic apparatus, the method comprising:
- detecting a touch operation on a touch panel;
- selecting positions on a display unit via a touch operation on the touch panel; and
- performing control so that, in a case where a touch position movement is performed on the touch panel, positions are selected from among positions of a plurality of selective candidates on the display unit existing in a direction of the touch position movement from a starting position of the touch position movement to a touch position at a first timing, based on a touch position movement up to a second timing after the first timing.

24. A non-transitory computer-readable storage medium storing a program for executing a method, the method comprising:
- detecting a touch operation on a touch panel;
- selecting positions on a display unit via a touch operation on the touch panel; and
- performing control so that, in a case where a touch position movement is performed on the touch panel, positions are selected from among positions of a plurality of selective candidates on the display unit existing in a direction of the touch position movement from a starting position of the touch position movement to a touch position at a first timing, based on a touch position movement up to a second timing after the first timing.

* * * * *